US012565382B2

(12) United States Patent
Smith et al.

(10) Patent No.: US 12,565,382 B2
(45) Date of Patent: Mar. 3, 2026

(54) MOTOR DRIVEN ROLLER TRANSMISSION SYSTEM FOR CONVEYANCE SYSTEM

(71) Applicant: Dematic Corp., Grand Rapids, MI (US)

(72) Inventors: Travis Smith, Comstock Park, MI (US); Tyler Ernest, Cedar Springs, MI (US); Harry T. German, Belding, MI (US)

(73) Assignee: Dematic Corp., Grand Rapids, MI (US)

( * ) Notice: Subject to any disclaimer, the term of this patent is extended or adjusted under 35 U.S.C. 154(b) by 141 days.

(21) Appl. No.: 18/335,471

(22) Filed: Jun. 15, 2023

(65) Prior Publication Data

US 2023/0406642 A1 Dec. 21, 2023

Related U.S. Application Data

(60) Provisional application No. 63/352,443, filed on Jun. 15, 2022.

(51) Int. Cl.
B65G 13/06 (2006.01)
B65G 47/54 (2006.01)

(52) U.S. Cl.
CPC ............. B65G 13/06 (2013.01); B65G 47/54 (2013.01)

(58) Field of Classification Search
CPC ........ B65G 13/02; B65G 13/04; B65G 13/06; B65G 13/065; B65G 13/07; B65G 47/53; B65G 47/54; B65G 13/10
(Continued)

(56) References Cited

U.S. PATENT DOCUMENTS

| | | | | | |
|---|---|---|---|---|---|
| 3,729,088 | A | * | 4/1973 | Stein | B65G 47/263 |
| | | | | | 198/781.07 |
| 4,174,774 | A | * | 11/1979 | Bourgeois | B65G 47/54 |
| | | | | | 198/463.3 |

(Continued)

FOREIGN PATENT DOCUMENTS

| | | | | | |
|---|---|---|---|---|---|
| GB | | 854497 A | * | 11/1960 | B65G 23/00 |

OTHER PUBLICATIONS

Commonly owned, co-pending U.S. Appl. No. 18/101,647, filed Jan. 26, 2023.

(Continued)

*Primary Examiner* — Gene O Crawford
*Assistant Examiner* — Muhammad Awais
(74) *Attorney, Agent, or Firm* — Gardner, Linn, Burkhart & Ondersma LLP

(57) ABSTRACT

A motor driven roller transmission system for a conveyance assembly includes a transmission assembly connected between a first rotatable member and a second rotatable member, in which the first and second rotatable members are oriented at an angle from one another. The transmission assembly is adapted to efficiently transfer rotational motion of the first rotatable member to the second rotatable member. Rotation of the second rotatable member causes a conveyance surface to move in order to convey an object. The transmission assembly decreases the power required to drive the first rotatable member in order to move the conveyance surface by increasing the torque output of the first rotatable member, while also reducing the rotational speed required of the first rotatable member to drive the conveyance surface at a desired speed, thus extending the operational life of the first rotatable member.

22 Claims, 8 Drawing Sheets

(58) Field of Classification Search
USPC ................. 198/370.09, 809, 780, 348, 370.1
See application file for complete search history.

(56) References Cited

U.S. PATENT DOCUMENTS

| | | | | |
|---|---|---|---|---|
| 4,880,099 A * | 11/1989 | Leemkuil | ............... | B65G 47/54 |
| | | | | 198/370.1 |
| 5,165,516 A * | 11/1992 | Reed | ...................... | B65G 47/54 |
| | | | | 198/370.1 |
| 5,568,857 A * | 10/1996 | Chen | ...................... | B65G 13/12 |
| | | | | 198/861.5 |
| 6,264,042 B1 * | 7/2001 | Cossey, Jr. | ............. | B07C 5/362 |
| | | | | 198/572 |
| 6,505,733 B2 | 1/2003 | Troupos et al. | | |
| 8,364,307 B2 * | 1/2013 | Carlson | ................. | B65G 47/54 |
| | | | | 198/370.09 |
| 8,590,691 B2 * | 11/2013 | Muller | ................... | B65G 47/53 |
| | | | | 198/370.09 |
| 9,248,981 B1 * | 2/2016 | Skoretz | ................. | B65G 43/00 |

| | | | | |
|---|---|---|---|---|
| 9,469,486 B2 | 10/2016 | German | | |
| 10,112,782 B2 * | 10/2018 | Wetters | ................. | B65G 13/07 |
| 2002/0092734 A1 * | 7/2002 | Troupos | ................ | B65G 47/54 |
| | | | | 198/370.1 |
| 2002/0108839 A1 * | 8/2002 | Baker | .................... | B65G 47/54 |
| | | | | 198/781.03 |
| 2004/0226803 A1 * | 11/2004 | Brixius | .................. | B65G 47/53 |
| | | | | 198/370.1 |
| 2009/0152074 A1 * | 6/2009 | Wolf | ..................... | B65G 47/54 |
| | | | | 198/370.1 |
| 2011/0073442 A1 * | 3/2011 | Rau | ...................... | B65G 17/345 |
| | | | | 198/779 |
| 2016/0046451 A1 * | 2/2016 | German | ................ | B65G 47/54 |
| | | | | 198/370.01 |

OTHER PUBLICATIONS

International Search Report and Written Opinion from corresponding Patent Cooperation Treaty (PCT) Application No. PCT/IB23/56230, completed Oct. 21, 2023 and mailed Dec. 1, 2023.

* cited by examiner

MOTOR DRIVEN ROLLER TRANSMISSION SYSTEM FOR CONVEYANCE SYSTEM

CROSS REFERENCE TO RELATED APPLICATION

The present invention claims priority of U.S. provisional application Ser. No. 63/352,443, filed on Jun. 15, 2022, which is hereby incorporated herein by reference in its entirety.

FIELD OF THE INVENTION

The present invention relates to material handling systems, and more particularly to drive systems for material handling conveyors.

BACKGROUND OF THE INVENTION

An object may be physically moved or transferred in a conveyance direction by a conveyance assembly. Occasionally, the object must be moved in a direction alternate to the conveyance direction in order to arrive at a desired location. The direction of the object may be changed by raising and operating a second or secondary conveyor line, moving in an alternate direction relative to the conveyance direction of a first or primary conveyor line. Conveyor lines are commonly driven directly by an energized rolling component, such as a motor driven roller.

SUMMARY OF THE INVENTION

A motor driven roller transmission system according to an aspect of the present invention is adapted to be used in a conveyor system or assembly to transfer the motion of a primary rotating member, such as a motorized driven roller (MDR), to a passively-driven secondary rotating member that is oriented at an angle relative to the primary rotating member. A transmission assembly—such as a worm gear assembly having a worm affixed to the primary rotating member, and a worm wheel engaged with the worm and affixed to the secondary rotating member—is adapted to transfer the motion of the primary rotating member to the secondary rotating member in a manner that may improve the energy efficiency and lifespan of the MDR. For example, the worm gear assembly may be configured such that the secondary rotating member is rotated at a higher rate than the primary rotating member. A conveyance surface is moved or driven upon rotation of the secondary rotating member to convey an object on the conveyance surface.

According to one form of the invention, a drive assembly is provided for driving a conveyance surface in a conveyor assembly, in which the drive assembly includes a first rotatable member oriented at an angle from a second rotatable member, and a transmission assembly coupled between the first and second rotatable members. The transmission assembly may transfer rotational motion from the first rotatable member configured as a drive shaft or roller to the second rotatable member configured as a driven shaft or roller to thereby rotate the second rotatable member. A conveyance surface movably coupled to the second rotatable member is drivable in response to rotation of the second rotatable member to convey an object thereon. Optionally, the first rotatable member is driven to rotate, and may include a motorized roller having a motor internal to a roller shell.

In one aspect, the transmission assembly may transfer rotational motion from the first rotatable member to the second rotatable member to rotate the second rotatable member at a different rate, which may be a faster rate, than the first rotatable member.

In another aspect, the transmission assembly includes a first gear coupled to the first rotatable member, and a second gear coupled to the second rotatable member, where the first gear may movably engage the second gear to transfer rotational motion from the first rotatable member to the second rotatable member.

In yet another aspect, the first gear includes a worm, and the second gear includes a worm wheel.

In still another aspect, the first rotatable member is oriented perpendicular to the second rotatable member.

In a further aspect, a lifting assembly may selectively raise and lower the conveyance surface.

According to another form of the present invention, a right angle transfer includes a first rotatable member having a first longitudinal axis oriented in a diverting direction, where the first rotatable member rotatably drivable about the first longitudinal axis. A worm coupled to the first rotatable member may rotate synchronously with the first rotatable member about the first longitudinal axis. A second rotatable member having a second longitudinal axis is oriented in a conveyance direction at an angle relative to the diverting direction, and a worm wheel coupled to the second rotatable member may engage the worm. A plurality of diverting members are drivable by the second rotatable member to convey an object in the diverting direction. The worm may engage the worm wheel to rotate the second rotatable member when the first rotatable member is rotatably driven, where the diverting members are driven in response to rotation of the second rotatable member.

In one aspect, a plurality of conveying members are drivable to convey an object in the conveyance direction.

In another aspect, the diverting members are coupled to a frame, and the lifting assembly includes a plurality of spaced-apart vertical actuators adapted to selectively raise and lower the frame relative to the conveying members. Optionally, the vertical actuators include cylinders that are drivable in each of opposite directions by application of compressed air to opposite sides of the cylinders in order to positively drive the frame to both a raised state and a lowered state.

In yet another aspect, the diverting members include drivable belts.

In still another aspect, the conveyance direction is perpendicular to the diverting direction.

In yet a further aspect, the worm and the worm wheel are configured such that the second rotatable member rotates at a faster rate than the first rotatable member.

According to yet another form of the present invention, a geared drive system for a conveyor is provided, where the geared drive system includes a first rotatable member, and a second rotatable member that is perpendicular to the first rotatable member. A gear assembly includes a first gear coupled to the first rotatable member, and a second gear that is engaged with the first gear and coupled to the second rotatable member. A conveyance surface is movably coupled to the second rotatable member and is configured to convey an object in response to rotation of the second rotatable member. The first rotatable member is selectively energizable to rotate the first gear, where rotation of the first gear rotates the second gear. The rotation of the second gear rotates the second rotatable member to drive the conveyance surface. Optionally, the first and second gears are configured such that the second rotatable member rotates at a faster rate than the first rotatable member.

Thus, the motor driven transmission system of the present invention may enable an efficient transfer of motion from a rotating conveying member, such as a motorized driven roller, to a conveyance surface. A transmission assembly, such as a worm gear assembly, is coupled to a primary rotating member and a secondary rotating member. As the primary rotating member is driven or energized to rotate, the rotational motion of the primary rotating member is transferred through the transmission assembly to rotate the secondary rotating member, preferably at a higher rate than the primary rotating member. A conveyance surface is driven by rotation of the secondary rotating member to convey an object. The transmission assembly increases the torque output of the primary rotating member, while also reducing the rotational speed of the primary rotating member that would otherwise be required to drive the conveyance surface at a desired speed. Accordingly, the power necessary to drive the primary rotating member is reduced, which may ultimately increase the efficiency and longevity of the primary rotating member.

These and other objects, advantages, purposes and features of the present invention will become apparent upon review of the following specification in conjunction with the drawings.

DETAILED DESCRIPTION OF THE PREFERRED EMBODIMENTS

Figure 1:
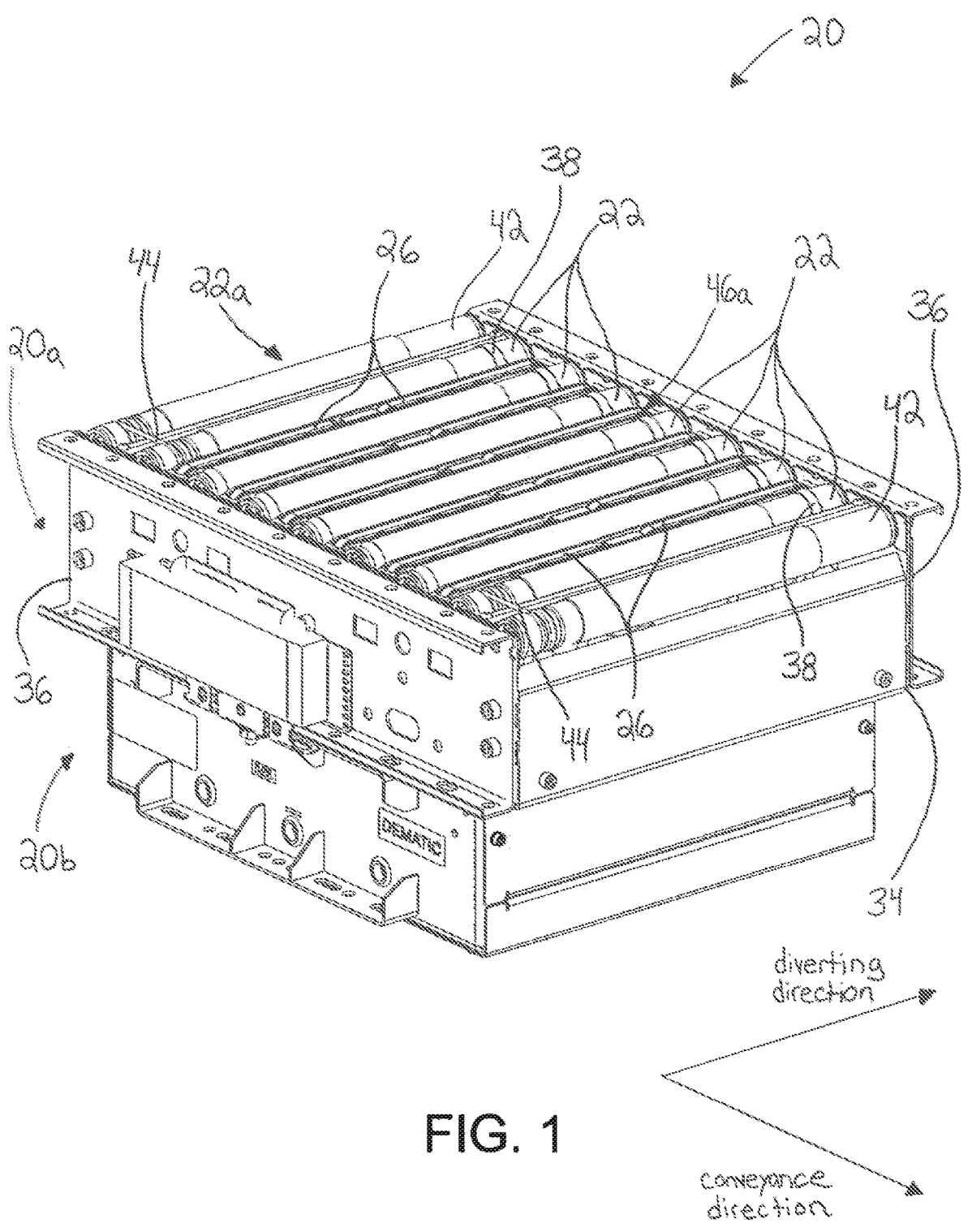
FIG. 1 is a perspective view of a right angle transfer in accordance with the present invention.
Figure 2:
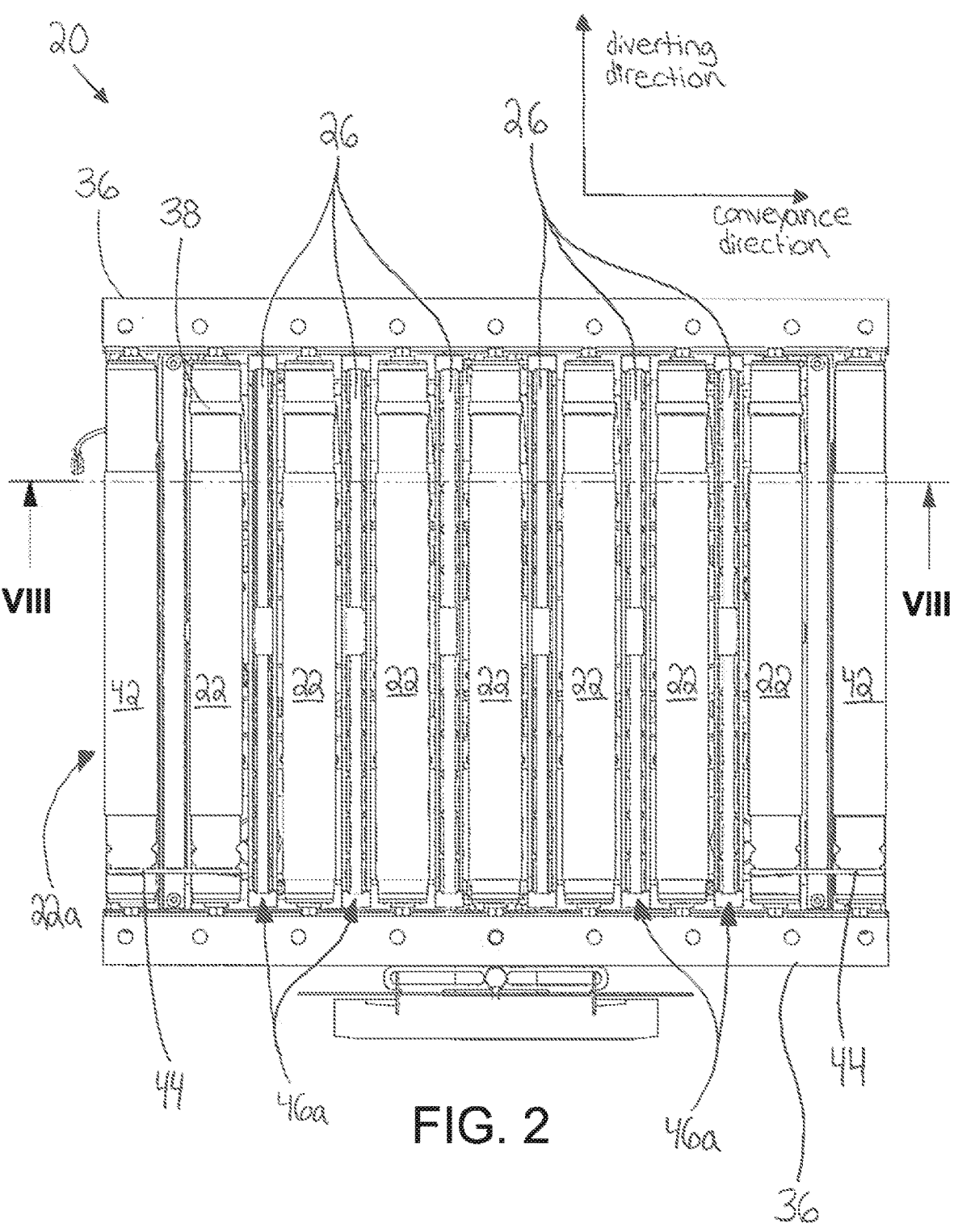
FIG. 2 is a top plan view of the right angle transfer of FIG. 1.
Figure 3:
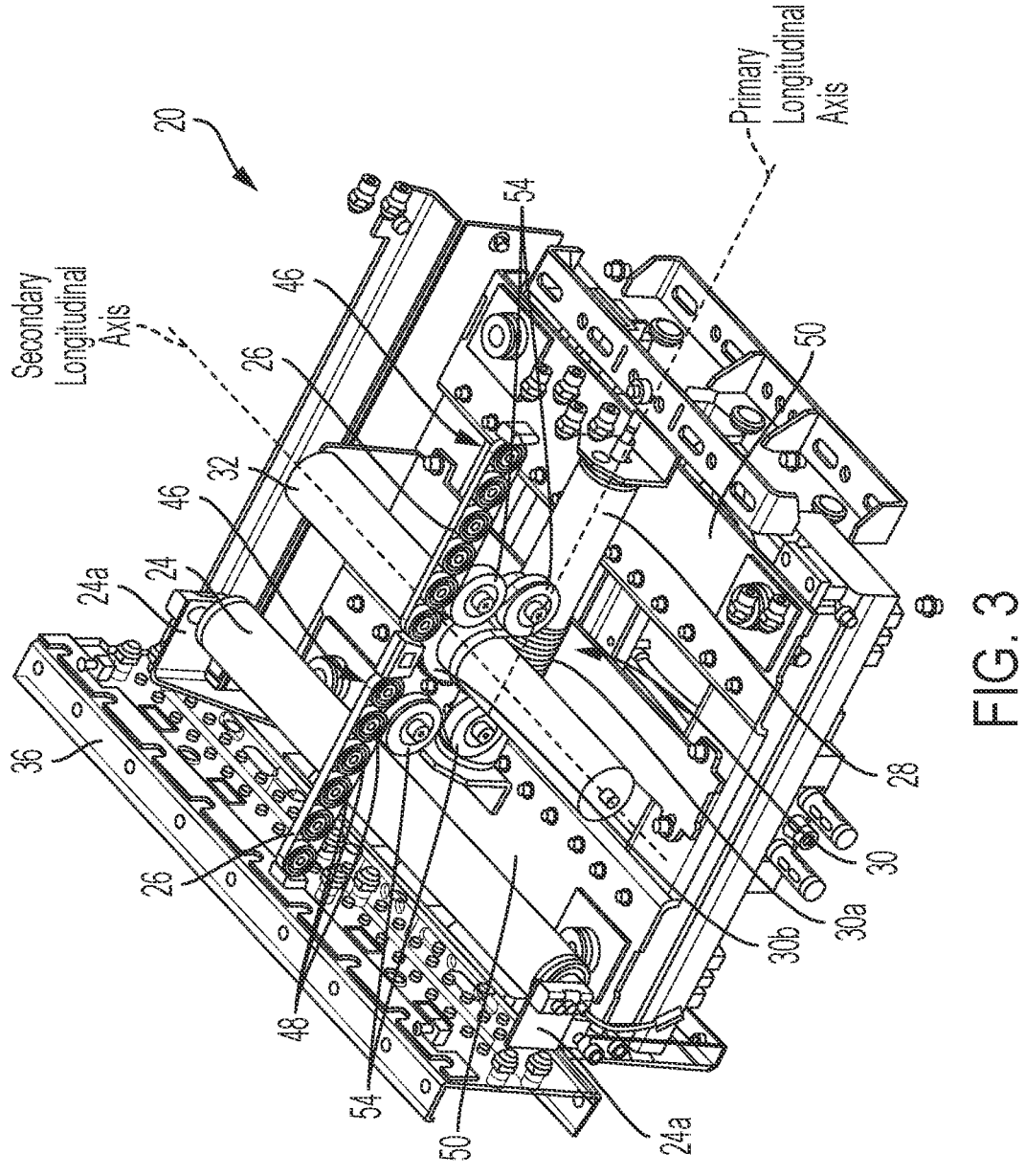
FIG. 3 is a perspective view of the right angle transfer of FIG. 1, depicted with a conveyance surface removed to show a motor driven transmission system.

The present invention will now be described with reference to the accompanying figures, wherein the numbered elements in the following written description correspond to like-numbered elements in the figures. A conveyance or conveyor assembly in the form of right angle transfer 20 includes a series of conveying rollers 22 that are drivable by conveying drive 24 to convey an object, such as a package, in a conveyance direction (FIGS. 1 and 3). A series of diverting belts 26 are driven by a diverting drive 28 to convey an object in an alternate direction or diverting direction (FIGS. 2, 4-6, and 9). Diverting drive 28 drives diverting belts 26 via a transmission assembly in the form of worm gear assembly 30 that transfers the rotational motion of diverting drive 28 to a passive (i.e. not self-powered and/or electrically-driven) line shaft 32. In doing so, worm gear assembly 30 reduces the power consumption of diverting drive 28 during operation by increasing the torque output of diverting drive 28, while also reducing the rotational speed required by diverting drive 28 necessary to drive diverting belt 26 at a sufficient speed to efficiently convey an object in the diverting direction. The reduced power requirements of diverting drive 28 needed to drive diverting belt 26 may increase the operational lifetime of diverting drive 28, while also improving the efficiency and reducing the costs required to operate a conveyor assembly. As will be described in further below, a right angle assembly and/or lifting assembly in accordance with the present disclosure may be constructed in a similar manner as is described in commonly owned and assigned U.S. Pat. Nos. 6,505,733 and 9,469,486; and U.S. nonprovisional application Ser. No. 18/101,647, which was filed Jan. 26, 2023, which are each incorporated herein by reference.

Figure 4:
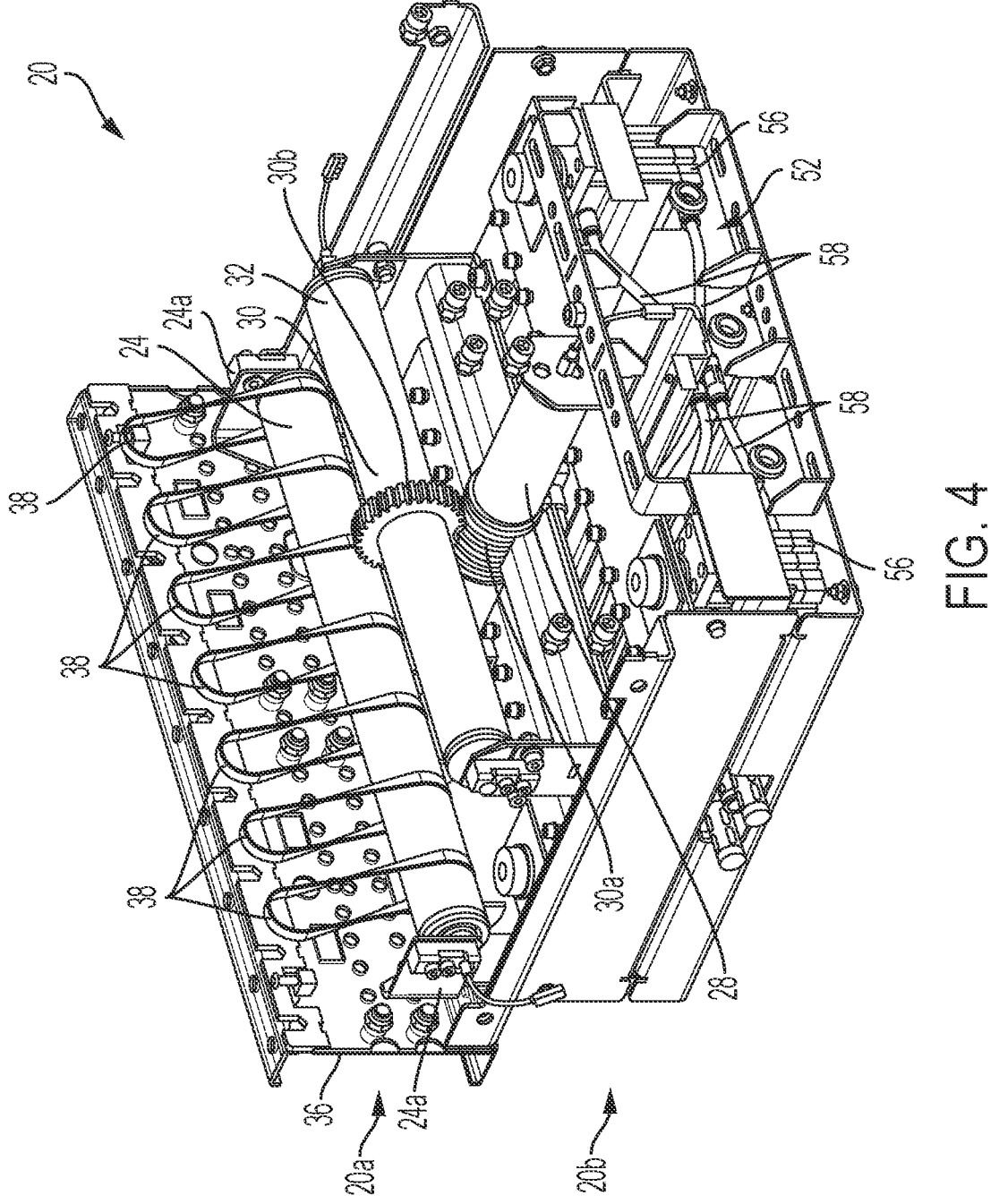
FIG. 4 is another perspective view of the right angle transfer of FIG. 3, depicted with an additional portion of the conveyance surface removed to show additional detail of the motor driven transmission system.
Figure 5:
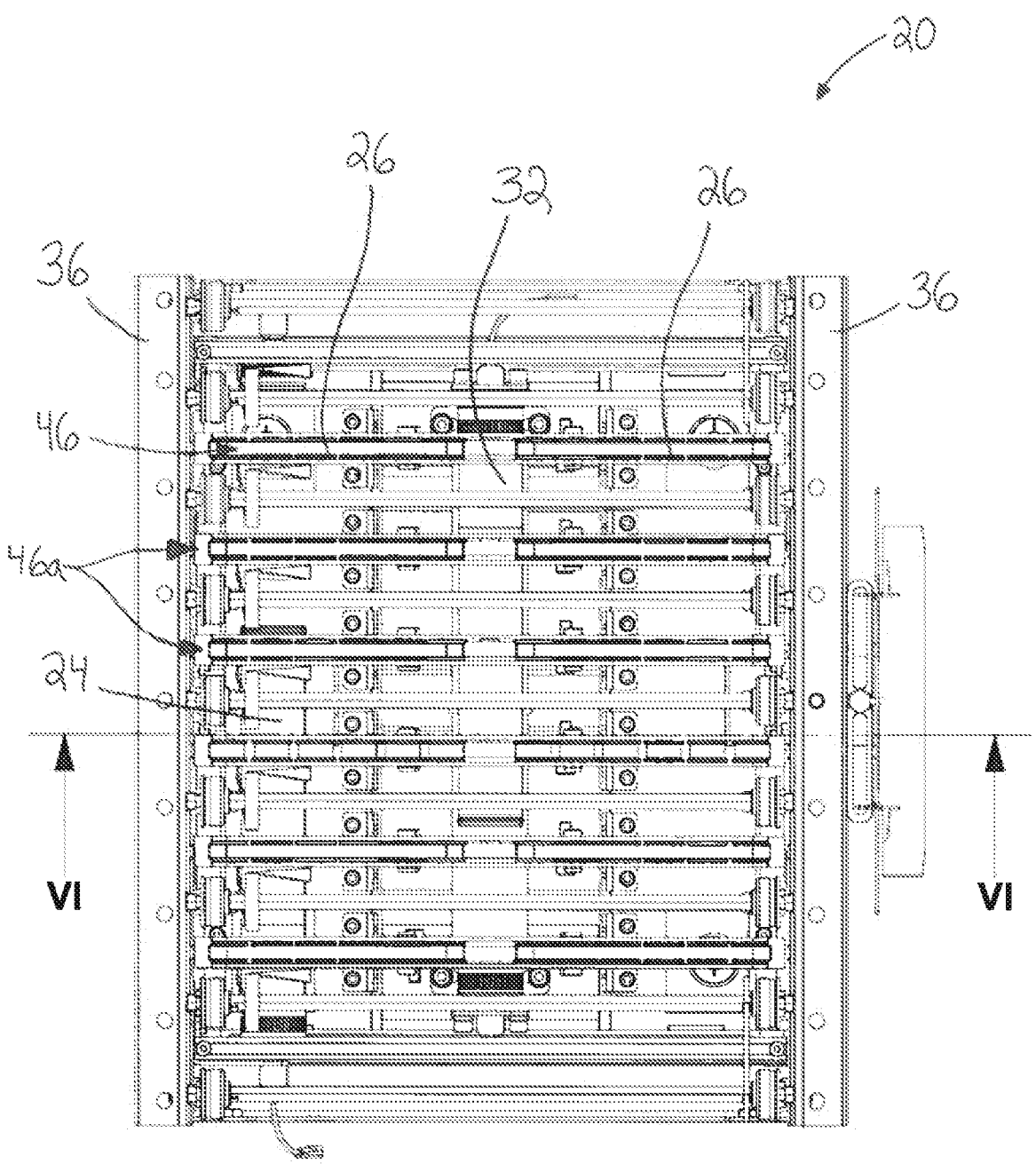
FIG. 5 is a top plan view of the right angle transfer of FIG. 1, depicted with conveying members of the conveyance surface removed to show internal structure of the right angle transfer.
Figure 6:
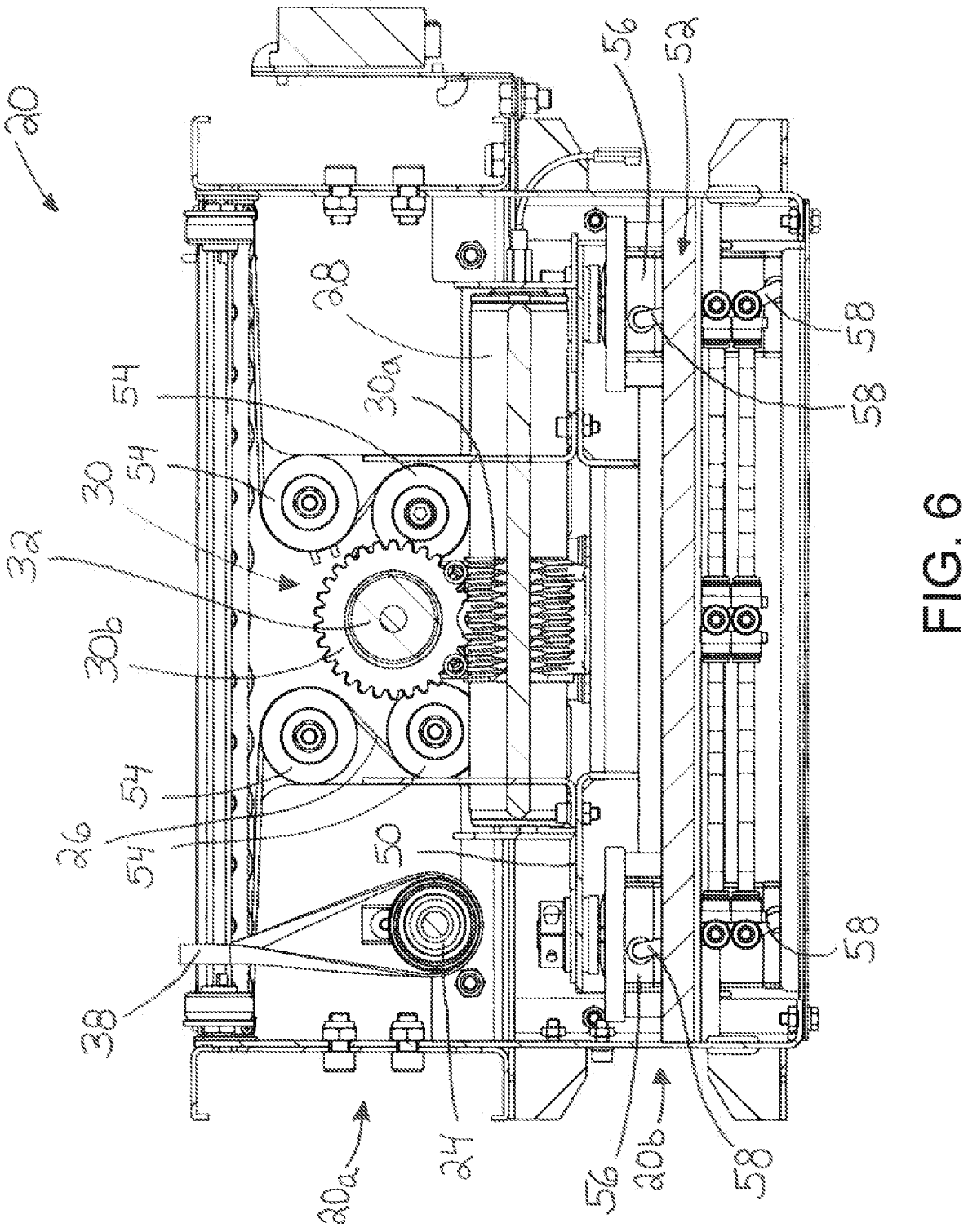
FIG. 6 is a sectional view of the right angle transfer of FIG. 5, taken along the line VI-VI.
Figures 7, 8:
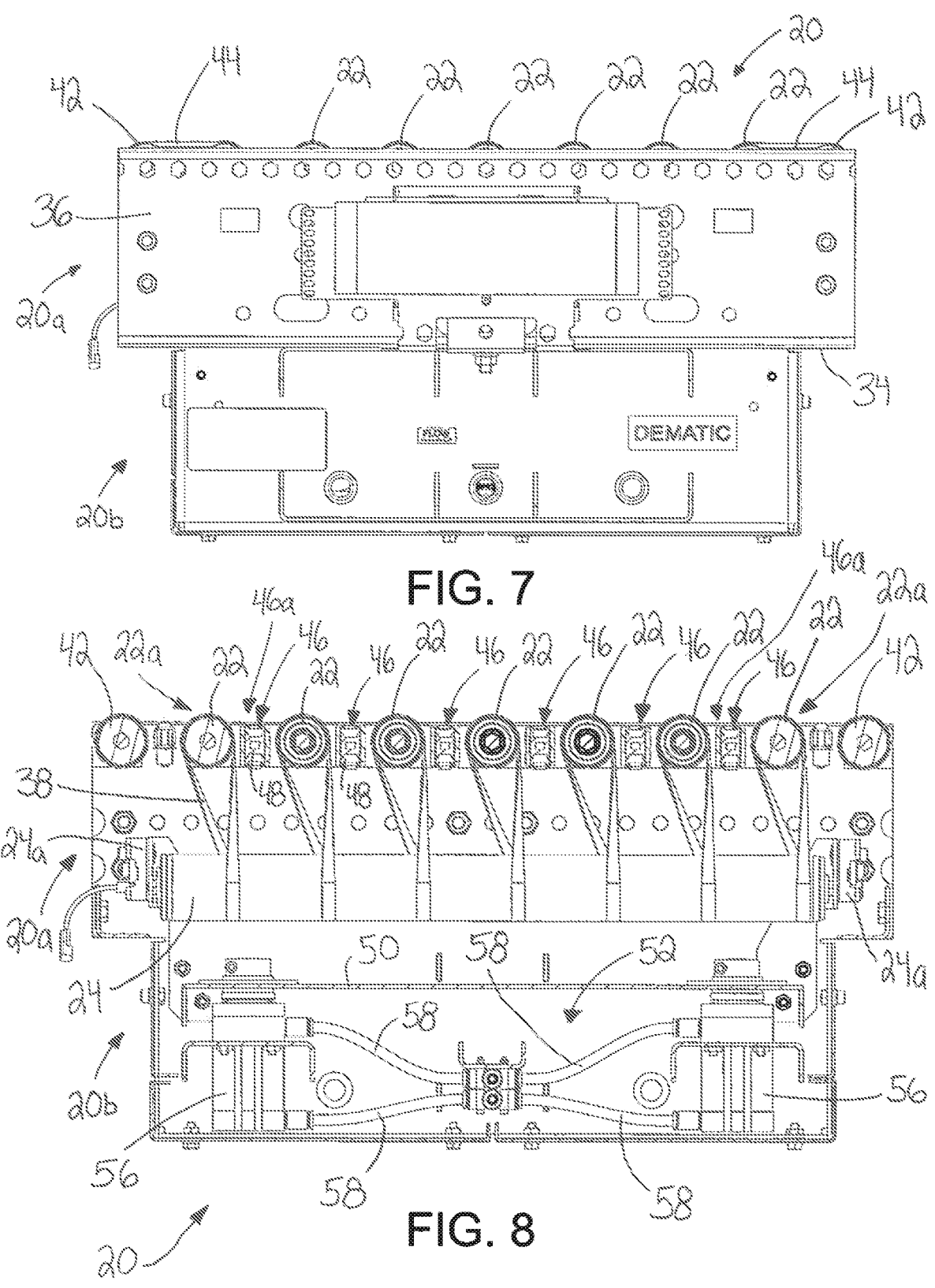
FIG. 7 is a side elevation view of the right angle transfer of FIG. 1.
FIG. 8 is a sectional view of the right angle transfer of FIG. 2, taken along the line of VIII-VIII.

Referring to FIGS. 1, 2, 5, 7, and 8, right angle transfer 20 includes an upper portion 20a having a base 34 and opposing side walls 36 providing support for many of the components of right angle transfer 20, including conveying rollers 22 (conveying members) and diverting belts 26. Conveying rollers 22 are cylindrically-shaped rollers mounted between sidewalls 36, and collectively form a conveyance surface 22a. Conveying drive 24 is an electrically-powered conveying member in the form of a motorized driven roller (MDR) or self-driven roller with an internal motor that can be energized to rotate an outer roller shell relative to an inner axle or shaft that is used to mount conveying drive 24 (FIGS. 4-6, 8, and 9), such as provided by Dematic Corp. of Grand Rapids, Michigan. The motorized driven roller may be configured as disclosed in, for example, U.S. Pat. Nos. 10,112,782 or 8,364,307, which are incorporated herein by reference. Conveying drive 24 drives a series of conveying drive bands 38 to rotate conveying rollers 22. Opposing ends of conveying drive 24 are mounted to base 34 via conveying drive mounts 24a. Conveying drive bands 38 wrap around the exterior of both the roller shell of conveying drive 24 and a groove formed along the exterior surface of each conveying roller 22. Conveying drive bands 38 are twisted to accommodate the perpendicular orientation and rotation direction of conveying drive 24 relative to that of conveying rollers 22 (FIGS. 3, 4, and 8). Each opposing end of right angle transfer 20 has an idle conveying roller 42 that is not directly driven by conveying drive 24. Rather, a pair of O-ring bands 44 couple each idle conveying roller 42 to an adjacent conveying roller 22 such that the rotation of each idle conveying roller 42 is synchronous with its respective adjacent conveying roller 22. Conveying rollers 22 are driven by conveying drive 24 to transport or move an object in contact with one or more conveying rollers 22 in the conveyance direction.

A series of diverting members 46, in the form of diverting rollers or spaced-apart grooved wheels or blades 48 and diverting belts 26, are interspersed between conveying rollers 22 to collectively form a diverting surface 46a. Diverting surface 46a is another or second conveyance surface that conveys objects in a diverting direction, which is different than the conveyance direction (FIGS. 1-3, 5, 6, and 8). Each set of diverting rollers 46 support a diverting belt 26, where diverting rollers 46 are mounted to a frame 50 that is operable to be selectively raised and lowered via a lifting assembly 52, which thereby also raises and lowers diverting surface 46*a* relative to conveyance surface 22*a*. As shown in FIG. 1, in the illustrated embodiment the diverting direction is generally perpendicular to the conveyance direction. However, it should be appreciated that the diverting direction, or direction that a diverting belt is driven, could be any direction at an angle from the conveyance direction.

As shown in FIGS. 3, 4, 6, and 9, a primary rotating member or first rotatable member in the form of diverting drive 28 that is configured as a drive shaft or roller and is angled relative to a second rotatable member in the form of line shaft 32 that is configured as a driven shaft or roller. A transmission assembly or gear assembly in the form of worm gear assembly 30 is located, at least in part, between diverting drive 28 and line shaft 32 to transfer rotational motion of diverting drive 28 about its longitudinal axis (i.e. primary or first longitudinal axis) to the line shaft 32 to cause line shaft 32 to rotate about its longitudinal axis (i.e. secondary or second longitudinal axis). In the illustrated embodiment, diverting drive 28 is a motorized or self-driven roller, which may be similar to that of conveying drive 24, and is mounted to frame 50. Line shaft 32 is a passively-driven rotatable member that is also mounted to frame 50 in an orientation that is perpendicular to that of diverting drive 28.

Worm gear assembly 30 includes a primary or first gear in the form of worm 30*a* having teeth and grooves configured to slidably and/or movably engage with or transfer motion to counterpart teeth and grooves of a secondary or second gear in the form of a worm wheel 30*b*. Worm 30*a* is externally coupled or mounted to the exterior or outer surface of diverting drive 28 and arranged coaxially with diverting drive 28, and worm wheel 30*b* is externally coupled or mounted to the exterior or outer surface of line shaft 32. In other words, the worm 30*a* is fixed to diverting drive 28 and rotates synchronously with diverting drive 28, and worm wheel 30*b* is fixed to line shaft 32 and rotates synchronously with line shaft 32. Therefore, as diverting drive 28 is energized to rotate about the first longitudinal axis, worm 30*a* will similarly rotate about the first longitudinal axis. While worm 30*a* rotates, the teeth and grooves of worm 30*a* make contact with and/or engage counterpart teeth and grooves on worm wheel 30*b* to thereby transfer the rotational motion of worm 30*a* to worm wheel 30*b*, such that worm 30*a* drives worm wheel 30*b*. Because worm wheel 30*b* is fixed to line shaft 32, the rotation of worm wheel 30*b* causes line shaft 32 to rotate synchronously with worm wheel 30*b* about the second longitudinal axis. It should be appreciated that in addition to or alternative to the arrangement described above, a worm and worm wheel, as well as other components of a transmission assembly may be integrated into or at least partially mounted internal to primary and/or secondary rotating members.

Figure 9:
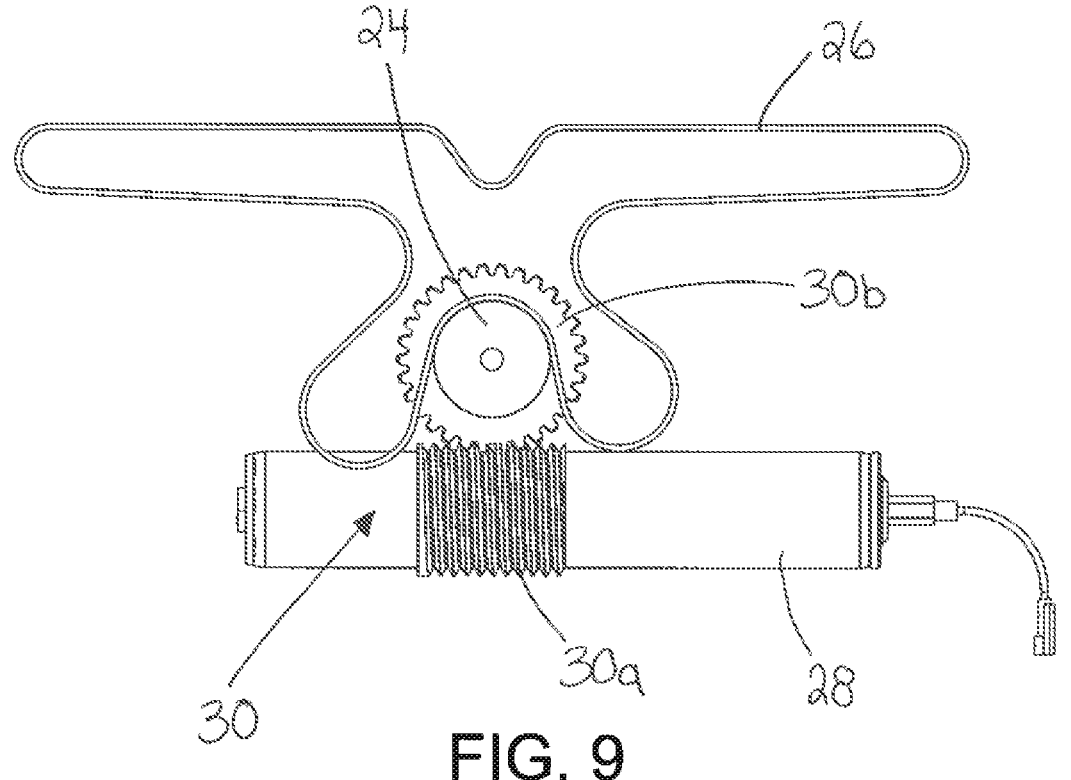
FIG. 9 is an end elevation view of a portion of the motor driven transmission system of FIG. 3 depicted in isolation.

Diverting belt 26 is frictionally engaged with and wraps around line shaft 32 such that rotation of line shaft 32 drives rotation of diverting belts 26 (FIGS. 3, 6, and 9). A series of tension pulleys 54 are also provided in drive communication or contact with diverting belt 26 to apply tension to the diverting belt 26. Diverting belt 26 is positioned to come into contact with an object to convey or move the object in the diverting direction, when the diverting surface 46*a* is raised above the conveyance surface 22*a*. It should be appreciated that a drive assembly, which may include at least two rotatable members in which at least one rotatable member is driven to rotate, a transmission assembly that couples the rotatable members to one another, and a driven surface such as a conveyance surface, may take alternative forms apart from what has been described above. For example, a driven surface could include a conveyance surface that moves objects in a conveyance direction, or direction at an angle from a diverting direction. Additionally, a conveyor assembly may include more than one drive system to drive more than one conveyance surface.

With reference to FIGS. 4 and 8, lifting assembly 52 is located in a lower portion 20*b* of right angle transfer 20, and is adapted to raise and lower diverting surface 46*a* with respect to conveyance surface 22*a*. When diverting surface 46*a* is located above conveyance surface 22*a*, diverting surface 46*a* is enabled to support an object that was previously in contact with, supported on, and/or being conveyed by conveyance surface 22*a*, such that diverting surface 46*a* may convey and/or divert the object in the diverting direction. When diverting surface 46*a* is located below conveyance surface 22*a*, an object may be freely conveyed across conveyance surface 22*a* in the conveyance direction. In the illustrated embodiment, lifting assembly 52 includes a plurality of spaced apart vertical actuators, where each actuator is in the form of a cylinder 56 that is fluidly connected to a pair of fluid conduits or hoses 58 (FIGS. 6 and 8). Cylinders 56 may be positively driven both upward and downward by the application of a fluid, such as compressed air, to opposite sides of cylinder 56 via hoses 58. Cylinders 56 are secured to frame 50 to raise and lower frame 50 as cylinders 56 are driven upward and downward by compressed air. Because diverting drive 28, worm gear assembly 30, line shaft 32, and diverting surface 46*a* are also mounted directly or indirectly to frame 50, these components are all simultaneously raised and lowered as frame 50 is raised and lowered relative to conveyance surface 22*a* by cylinders 56 of lifting assembly 52.

It should be appreciated that the form of a worm and a worm wheel may vary within the scope of the present invention. For example, both a worm and worm wheel may be properly sized and defined, for example by adjusting the gear ratio between a worm and worm wheel or other gears, according to operational requirements and/or other variables—such as the speed a diverting belt is desired to move at, the load that a diverting drive will be subjected to during operation (such as by the weight of objects to be conveyed), etc. —to increase the efficiency of a diverting drive. The speed at which diverting belt 26 moves will be dependent upon the rotational speed of line shaft 32, where the rotational speed of line shaft 32 will be dependent on at least the rotational speed of diverting drive 28, and the characteristics of a worm gear assembly. Various characteristics of a worm gear assembly may be adjusted relative to one another to change the rotational speed of diverting drive 28 relative to line shaft 32. Among other characteristics, the diameters of the worm and worm wheel, as well as the gear ratio of the worm gear assembly may be selected and/or configured as desired depending on the operating requirements of a conveyor assembly. The gear ratio may be adjustable, in part, based on the size, spacing, geometry, and number of teeth on each of the worm and worm wheel.

Accordingly, a drive assembly for driving a conveyance surface and/or diverting surface in a conveyor assembly may include rotatable members, such as driven and/or passive rollers, that are angled relative to one another, and that are coupled to one another via a transmission assembly to rotate at different speeds or velocities relative to one another. In particular, diverting drive 28 may be driven to rotate at a different rotational speed or velocity relative to that of line shaft 32. This allows diverting drive 28 to be driven, for example, at a reduced rotational speed (as compared to a diverting drive on a conventional right angle transfer) that still drives line shaft 32 at a different rotational speed or velocity to move diverting belt 26 at a desired speed. Preferably, the worm gear assembly 30 is arranged such that line shaft 32 rotates at a higher rate than the diverting drive. The characteristics of a worm gear assembly may be similarly adjusted to increase the torque output of diverting drive 28. Accordingly, a worm gear assembly (or other transmission assembly) can be used to both increase the torque output of diverting drive 28 while also reducing the required rotational speed of diverting drive 28 necessary to drive diverting belts 26 at a desired speed. As such, the electrical current necessary to run diverting drive 28 at a given voltage (the power necessary to drive diverting drive 28) may be reduced as compared to conventional right angle transfers. Reducing the power requirements of diverting drive 28 in this manner may increase the operational lifespan of diverting drive 28 and improve the energy efficiency of the conveyance assembly, such as right angle transfer 20.

It should also be appreciated that a transmission assembly could take alternative forms apart from a worm gear assembly as described above. For example, a transmission assembly may include a helical gear assembly having a primary helical gear coupled to diverting drive 28, and a secondary helical gear coupled to line shaft 32, in which the helical gear assembly transfers the rotational motion of diverting drive 28 to line shaft 32 in a similar manner to what has been described above with respect to worm gear assembly 30. In another embodiment, a transmission assembly may take the form of a flexible elongated member such as a belt or ribbed belt that may engage with primary and secondary rotating members, in which the primary and secondary rotating members may include grooves or other engagement features that engage with the belt to transfer motion between the primary and secondary rotating members. Furthermore, a transmission assembly similar to that described above may be oriented and arranged for use as part of a system to drive conveyance members to convey an object in a conveyance direction. In other words, the line shaft may be oriented in the same manner as a series of rollers forming a conveyance surface to drive the rollers.

Changes and modifications in the specifically described embodiments may be carried out without departing from the principles of the present invention, which is intended to be limited only by the scope of the appended claims, as interpreted according to the principles of patent law including the doctrine of equivalents.

The invention claimed is:

1. A drive assembly for driving a conveyance surface in a conveyance assembly, said drive assembly comprising:
   a first rotatable member that is oriented at an angle from a second rotatable member;
   a transmission assembly coupled between said first rotatable member and said second rotatable member, said transmission assembly configured to transfer rotational motion from said first rotatable member to said second rotatable member to rotate said second rotatable member;
   a diverting member driveable by said second rotatable member and comprising said conveyance surface; and
   wherein said diverting member is movably coupled to said second rotatable member with, said conveyance surface being drivable in response to rotation of said second rotatable member to convey an object thereon;
   wherein said transmission assembly comprises a first gear coupled to said first rotatable member, and a second gear coupled to said second rotatable member, said first gear configured to movably engage said second gear to transfer rotational motion from said first rotatable member to said second rotatable member.

2. The drive assembly of claim 1, wherein said first rotatable member comprises a drive roller and said second rotatable member comprises a driven roller.

3. The drive assembly of claim 1, wherein said transmission assembly is configured to transfer rotational motion from said first rotatable member to said second rotatable member to rotate said second rotatable member at a different rate than said first rotatable member.

4. The drive assembly of claim 3, wherein said transmission assembly is configured to transfer rotational motion from said first rotatable member to said second rotatable member to rotate said second rotatable member at a faster rate than said first rotatable member.

5. The drive assembly of claim 1, wherein said first gear comprises a worm, and said second gear comprises a worm wheel.

6. The drive assembly of claim 5, wherein said first rotatable member is oriented perpendicular to said second rotatable member.

7. The drive assembly of claim 6, wherein said first rotatable member comprises a motorized roller having a motor internal to a roller shell.

8. The drive assembly of claim 7, further comprising a lifting assembly adapted to selectively raise and lower said conveyance surface.

9. A right angle transfer device comprising:
   a first rotatable member comprising a drive roller and having a first longitudinal axis oriented in a diverting direction, said first rotatable member rotatably drivable about said first longitudinal axis;
   a worm coupled to said first rotatable member and configured to rotate synchronously with said first rotatable member about said first longitudinal axis;
   a second rotatable member comprising a driven roller and having a second longitudinal axis oriented in a conveyance direction at an angle relative to the diverting direction;
   a worm wheel coupled to said second rotatable member and configured to engage said worm; and
   a plurality of diverting members drivable by said second rotatable member and configured to convey an object in the diverting direction;
   wherein said worm is configured to engage said worm wheel to rotate said second rotatable member when said first rotatable member is rotatably driven; and
   wherein said diverting members are driven in response to rotation of said second rotatable member.

10. The right angle transfer device of claim 9, further comprising a plurality of conveying members configured to be driven to convey an object in the conveyance direction.

11. The right angle transfer device of claim 10, further comprising a lifting assembly adapted to selectively raise and lower said diverting members relative to said conveying members.

12. The right angle transfer device of claim 11, further comprising a frame to which said diverting members are coupled, wherein said lifting assembly comprises a plurality of spaced-apart vertical actuators that are adapted to selectively raise and lower said frame relative to said conveying members.

13. The right angle transfer device of claim 12, wherein said vertical actuators comprise cylinders that are drivable in each of opposite directions by application of compressed air to opposite sides of said cylinders in order to positively drive said frame to both a raised state and a lowered state.

14. The right angle transfer device of claim 11, wherein said diverting members comprise drivable belts.

15. The right angle transfer device of claim 14, wherein said first rotatable member comprises a motorized roller having a motor internal to a roller shell.

16. The right angle transfer device of claim 15, wherein said conveyance direction is perpendicular to said diverting direction.

17. The right angle transfer device of claim 16, wherein said worm and said worm wheel are configured such that said second rotatable member rotates at a faster rate than said first rotatable member.

18. A geared drive system for a conveyor, said geared drive system comprising:
   a first rotatable member;
   a second rotatable member that is perpendicular to said first rotatable member;
   a gear assembly comprising a first gear coupled to said first rotatable member, and a second gear engaged with said first gear and coupled to said second rotatable member; and
   a diverting member having a conveyance surface, wherein said diverting member is movably coupled to said second rotatable member and configured to convey an object on said conveyance surface in response to rotation of said second rotatable member;

wherein said first rotatable member is selectively energizable to rotate said first gear;
   wherein rotation of said first gear rotates said second gear; and
   wherein rotation of said second gear rotates said second rotatable member to drive said conveyance surface.

19. The geared drive system of claim 18, wherein said first and second gears are configured such that said second rotatable member rotates at a faster rate than said first rotatable member.

20. The drive assembly of claim 1, wherein said diverting member comprises a plurality of diverting members that are each driveable by said second rotatable member, and wherein said diverting members define said conveyance surface.

21. The drive assembly of claim 1, further comprising a lifting assembly configured to selectively raise and lower said diverting member, wherein said lifting assembly comprises an actuator.

22. The drive assembly of claim 21, wherein said diverting member is disposed adjacent conveyor rollers that define another conveyance surface defining a first conveyance direction, and wherein said conveyance surface of said diverting member defines a second conveyance direction with the second conveyance direction being angled relative to the first conveyance direction.

* * * * *